United States Patent
Haas

(10) Patent No.: US 7,578,389 B1
(45) Date of Patent: Aug. 25, 2009

(54) OPTICAL DISC MAILPIECE FOR AUTOMATED LETTER PROCESSING BY U.S. POSTAL SERVICE EQUIPMENT

(75) Inventor: Janice Haas, Bethlehem, CT (US)

(73) Assignee: Cinram International Inc., Scarborough Ontario (CA)

( * ) Notice: Subject to any disclaimer, the term of this patent is extended or adjusted under 35 U.S.C. 154(b) by 0 days.

(21) Appl. No.: 12/114,512

(22) Filed: May 2, 2008

(51) Int. Cl.
*B65D 85/57* (2006.01)
(52) U.S. Cl. .................................. 206/312; 229/92.8
(58) Field of Classification Search ............. 206/308.1, 206/311, 312, 313, 476, 486, 489, 784, 750; 229/92.8, 92, 87.5
See application file for complete search history.

(56) References Cited

U.S. PATENT DOCUMENTS

| | | | |
|---|---|---|---|
| 2,097,916 A | 11/1937 | Elmore et al. | |
| 3,381,888 A | 5/1968 | Schleutermann et al. | |
| 3,717,297 A | 2/1973 | Perry | |
| 4,200,189 A | 4/1980 | Hagelberg | |
| 4,473,153 A | 9/1984 | Colangelo | |
| 4,850,731 A | 7/1989 | Youngs | |
| 5,048,681 A | 9/1991 | Henkel | |
| 5,101,973 A | 4/1992 | Martinez | |
| 5,119,933 A | 6/1992 | Taylor | |
| 5,147,036 A | 9/1992 | Jacobs | |
| 5,248,032 A | 9/1993 | Sheu et al. | |
| 5,333,728 A | 8/1994 | O'Brien et al. | |
| 5,419,433 A | 5/1995 | Harrer et al. | |
| 5,460,265 A | 10/1995 | Kiolbasa | |
| 5,641,063 A | 6/1997 | Gambardella et al. | |
| 5,647,482 A | 7/1997 | Kleinfelder | |
| 5,657,867 A | 8/1997 | Fu et al. | |
| 5,662,217 A | 9/1997 | Durr | |
| 5,749,463 A | 5/1998 | Collins | |
| 5,769,216 A | 6/1998 | Collins | |
| 5,772,019 A | 6/1998 | Reed | |
| 5,775,490 A | 7/1998 | Baker et al. | |
| 5,791,467 A | 8/1998 | Mahone | |
| 5,931,293 A | 8/1999 | Seelenmeyer | |
| 6,016,907 A | 1/2000 | Dreier | |
| 6,129,389 A | 10/2000 | Younger | |
| 6,230,964 B1 * | 5/2001 | Saito | 229/92.8 |
| 6,398,024 B2 | 6/2002 | Koehn | |
| 6,434,867 B1 | 8/2002 | Ristau | |
| 6,981,587 B2 | 1/2006 | Gerric | |
| 7,070,048 B2 | 7/2006 | Gelardi et al. | |
| 2003/0230515 A1 | 12/2003 | Mouyal | |
| 2005/0029135 A1 | 2/2005 | Gerrie | |
| 2005/0224566 A1 * | 10/2005 | Butler | 229/301 |
| 2005/0247769 A1 | 11/2005 | Potter et al. | |
| 2005/0252801 A1 | 11/2005 | Buck | |
| 2006/0006080 A1 * | 1/2006 | Gustafsson et al. | 206/308.1 |
| 2006/0283729 A1 * | 12/2006 | Feffer | 206/232 |

OTHER PUBLICATIONS

Quick Service Guide 201, 201a, 201b (Mar. 13, 2008).

* cited by examiner

*Primary Examiner*—Jacob K Ackun, Jr.
(74) *Attorney, Agent, or Firm*—Cooper & Dunham LLP

(57) ABSTRACT

A mailpiece for optical discs and like articles that can meet the U.S. Postal Service standards for automated letter processing by Postal Service equipment and thus qualify for appropriated postal mailing rates.

20 Claims, 3 Drawing Sheets

OPTICAL DISC MAILPIECE FOR AUTOMATED LETTER PROCESSING BY U.S. POSTAL SERVICE EQUIPMENT

TECHNICAL FIELD

This patent specification relates to mailpieces for optical discs and similarly shaped and dimensioned articles.

BACKGROUND

Optical discs such as Compact Discs (CDs) and DVDs often are mailed through the U.S. Postal Service in packages that contain one or more discs and may also include printed material that can be on the package or in the form of separate sheets inserted in or otherwise secured to the package. One of the goals in designing such products is to provide a package that will safely transport its contents. Another is to make that package easy to use both by the sender and the recipient. Yet another is to make the package convenient and inexpensive to manufacture, and to provide convenient ways to print on the package and to insert a disc therein and to address the package and provide postage. Another very important consideration, particularly when large numbers of packages are to be mailed, is the postage rate. As can be appreciated, some of these goals conflict. For example, a package may be made very sturdy to protect the disc but this may also make it heavy and expensive to manufacture and to ship. Conversely, a package may to inexpensive to make and ship but may not offer sufficient protection. Many proposals have been made for such packaging, including as discussed in the following U.S. Patents and published patent applications, which hereby are incorporated by reference in this patent specification: US 2005/0247769 A1; US 2003/0230515 A1; US 2005/0029135 A1; US 2005/0252801 A1; U.S. Pat. Nos. 7,070,048 B2; US 6,981,587 B2; US 6,434,867 B1; US 6,398,024 B2; 6,129,389; 6,016,907; 5,791,467; 5,931,293; 5,791,467; 5,775,490; 5,772,019; 5,769,216; 5,749,463; 5,647,482; 5,662,217; 5,657,867; 5,641,063; 5,460,265; 5,419,433; 5,333,728; 5,248,032; 5,154,284; 5,147,036; 5,119,933; 5,101,973; 5,048,681; 4,850,731; 4,473,153; 4,200,189; 3,381,888; 3,717,297; 2,097,916.

SUMMARY OF DISCLOSURE

This patent specification discloses an optical disc mailpiece that provides good protection for an optical disc, is convenient and inexpensive to manufacture and use, and may provide the very important benefit of meeting the U.S. Postal Service standards for automated letter processing. This means that a particularly advantageous postal rate can be applied for shipping quantities of such packages through the U.S. Postal Service because they can be processed using the Postal Service's automated letter handling equipment rather than hand sorting or other processing by hand applicable to packages that do not meet this standard. Currently, the standard is referred to in Quick Service Guide 201 and subsidiary guides cited therein, including but not limited to 201a and 201b. All of said guides are hereby incorporated by reference in this patent specification.

In one non-limiting example, the mailpiece starts as a five-panel unitary cardboard blank having a generally rectangular central panel, a left panel, a right panel, an upper panel and a front panel, with foldlines between the central panel and each of the other four panels. Text and images can be printed on, and labels can be attached by adhesives or otherwise to, each side of each panel as desired. The left panel has a cutout that is shaped and dimensioned to accept a peripheral portion of an optical disc such as a CD or a DVD of nominal diameter 120 mm or 80 mm or some other diameter. The mailer can alternatively accept non-circular optical information carriers or similarly shaped or dimensioned objects. To assemble the mailpiece, the left panel is folded under the central panel and a disc is partly inserted into the cutout. The cutout is shaped, positioned and dimensioned such that the disc is spaced from the left edge of the central panel by a considerable distance, such as an inch or more, but is adjacent, e.g., within a half-inch or a quarter inch, from the other three sides of the central panel. Then, the right panel is folded under the central panel and over the disc and the left panel, the upper panel is folded under the central panel and over the right panel, and the front panel is folded under the central panel and over the upper panel. The front panel of the assembled mailpiece is held in place with an element such as one or more water seals securing the front panel to the central panel, a tear strip, adhesive, double-sided adhesive tape or other known ways of sealing one cardboard panel to another.

Preferably, the assembled mailpiece with an optical disc inside is less than a quarter-inch thick, and is 7 inches long and 5 inches high. As mentioned above, the disc is offset from the left side of the mailpiece, to facilitate automated processing of the mailer by U.S. Postal Service equipment.

Also disclosed is a method of forming and using a mailpiece of the type described in this patent specification.

BRIEF DESCRIPTION OF THE DRAWINGS

The features of the subject matter of this patent specification can be more readily understood from the following detailed description with reference to the accompanying drawings wherein.

DETAILED DESCRIPTION OF PREFERRED EMBODIMENTS

Figure 1:
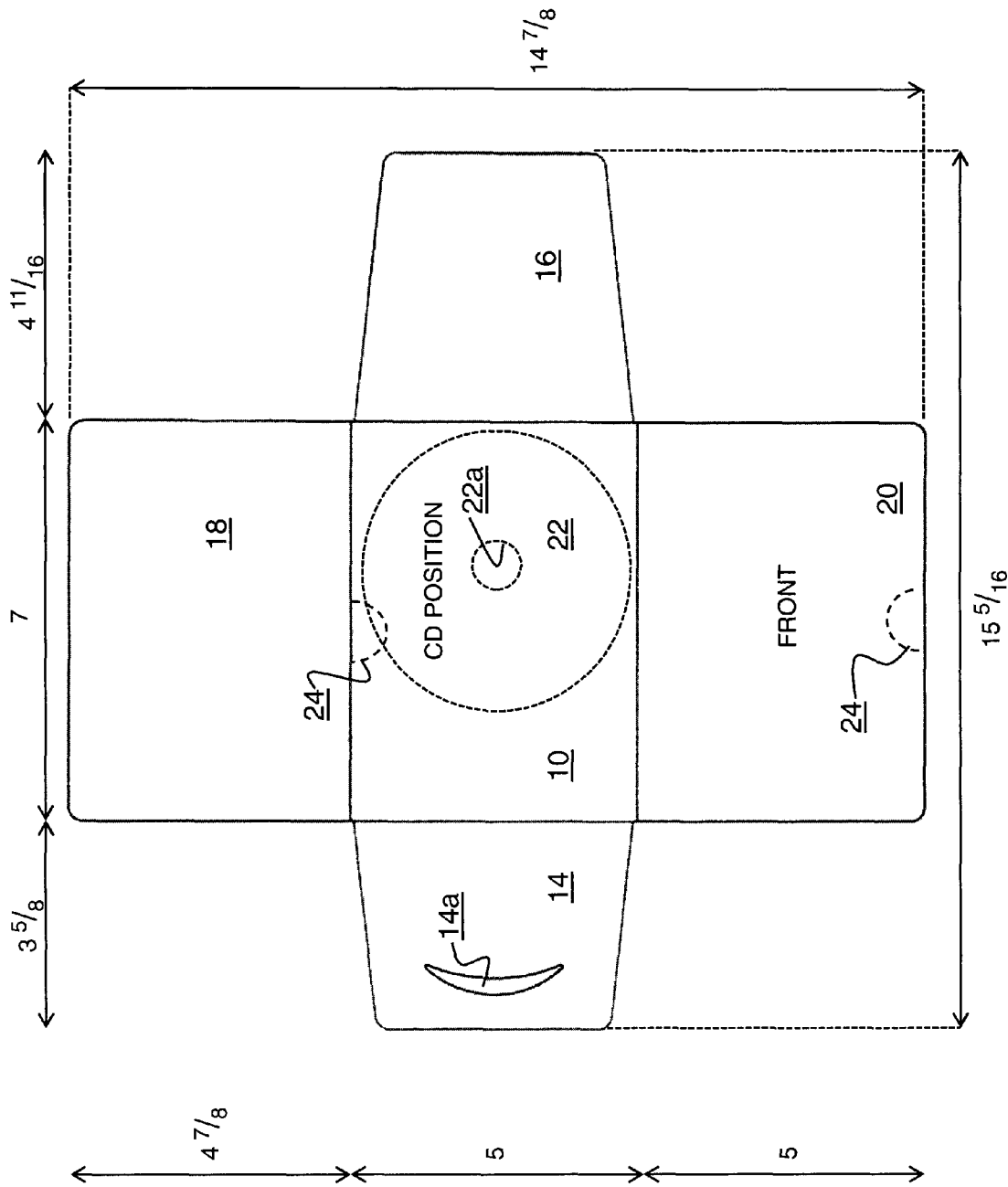
FIG. 1 is a plan view, to scale, of a cardboard blank used in one example of an optical disc mailpiece.

This patent specification describes a blank for forming a mailpiece for an optical disc or a similarly shaped and dimensioned article, and a method of making and using such a mailpiece.

In describing preferred embodiments illustrated in the drawings, specific terminology is employed for the sake of clarity. However, this patent specification is not intended to be limited to the specific terminology so selected and it is to be understood that each specific element includes all technical equivalents that operate in a similar manner. In addition, a detailed description of known functions and configurations will be omitted when it may obscure the subject matter of the invention described in the appended claims.

FIG. 1 illustrates an example of a cardboard blank for making an optical disc mailpiece. Preferred shapes and dimensions of one example of the blank are given in FIG. 1, but it should be understood that they are for only a particular example and do not limit the scope of the invention defined by the appended claims. The blank is a five-panel unitary cardboard blank having a generally rectangular central panel 10, a left panel 12, a right panel 14, an upper panel 16 and a front panel 20, with foldlines between central panel 10 and each of the other four panels. As seen in FIG. 1, the free corners of the left, right, upper and front panel preferably are rounded, preferably with a radius not greater than 0.125 inch. Text and images can be printed on, and labels can be attached by adhesives or otherwise to, each side of each panel as desired. The left panel has a cutout 14a that is shaped and dimensioned to accept a peripheral portion of an optical disc such as a CD or a DVD of nominal diameter 120 mm or 80 mm or some other diameter. The mailer can alternatively accept non-circular optical information carriers or similarly shaped or dimensioned objects.

Figure 2:
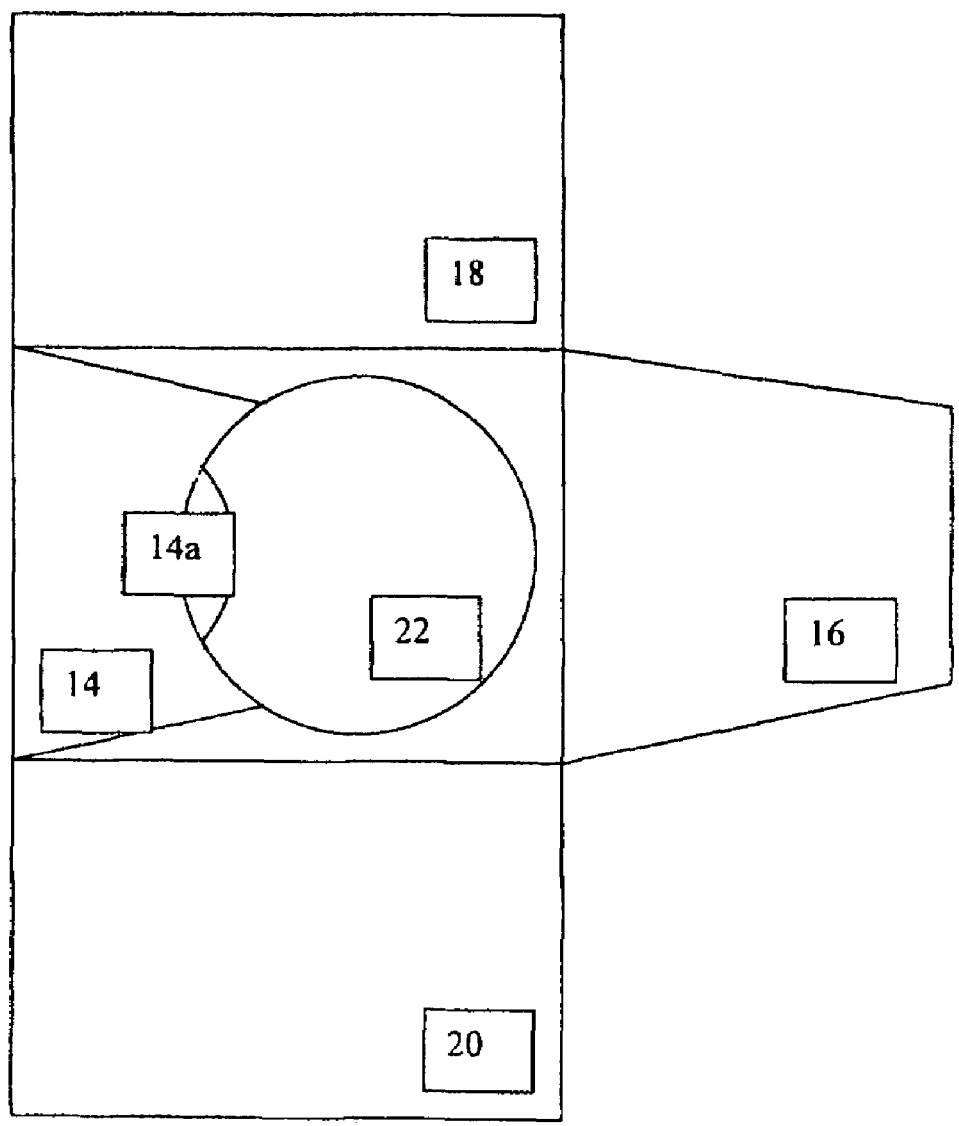
FIG. 2 is a plan view, not to scale, from the opposite side of the blank of FIG. 1, showing a left panel folded over and an optical disc partly inserted into a cutout of the folded panel.

To assemble the mailpiece, left panel 14 is folded under central panel 10 and an optical disc 22 disc is partly inserted into the cutout, as illustrated in FIG. 2, which is a schematic, not to scale view from the side of the blank opposite that of FIG. 1. Cutout 14a is shaped, positioned and dimensioned such that disc 22 is spaced from the left edge of central panel 10 by a considerable distance, such as an inch or more, but is adjacent, e.g., within a half-inch or a quarter inch, from the other three sides of the central panel. Then, as viewed from the side of the blank seen in FIG. 1, right panel 16 is folded under central panel 10 and over disc 22 and left panel 14, upper panel 18 is folded under central panel 10 and over right panel 16, and front panel 20 is folded under central panel 19 and over upper panel 18. As viewed from the side of the blank seen in FIG. 2, this process involves folding right panel 16 over disc 22 and left panel 14, folding upper panel 18 over right panel 16, and folding front panel 20 over upper panel 18. Front panel 20 of the assembled mailpiece can be secured in place with an element such as one or more wafer seals 24 securing front panel 20 to central panel 10. For example, half of a circular wafer seal is adhered to front panel 20 and half to central panel 10 as illustrated in FIG. 1. Alternative ways of securing front panel 20 in the assembled handpiece are possible, such as tear strips, adhesives, or double-sided stick tape.

Figure 3:
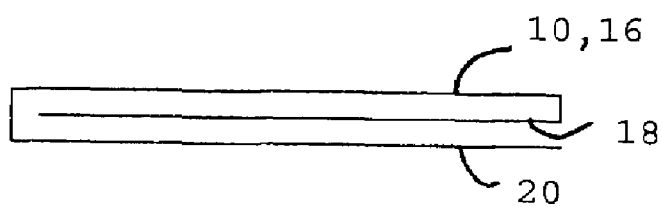
FIG. 3 is a left side view, not to scale, of the blank of FIG. 1 assembled into a mailpiece with an optical disc inside.
Figure 4:
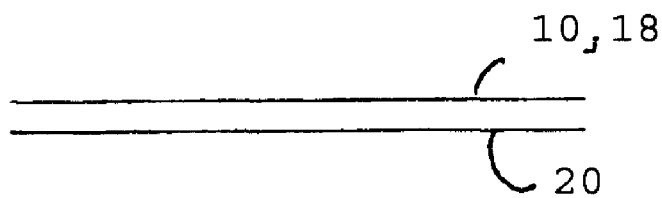
FIG. 4 is a schematic front side view, not to scale, of the blank of FIG. 1 assembled into a mailpiece with an optical disc inside.
Figure 5:
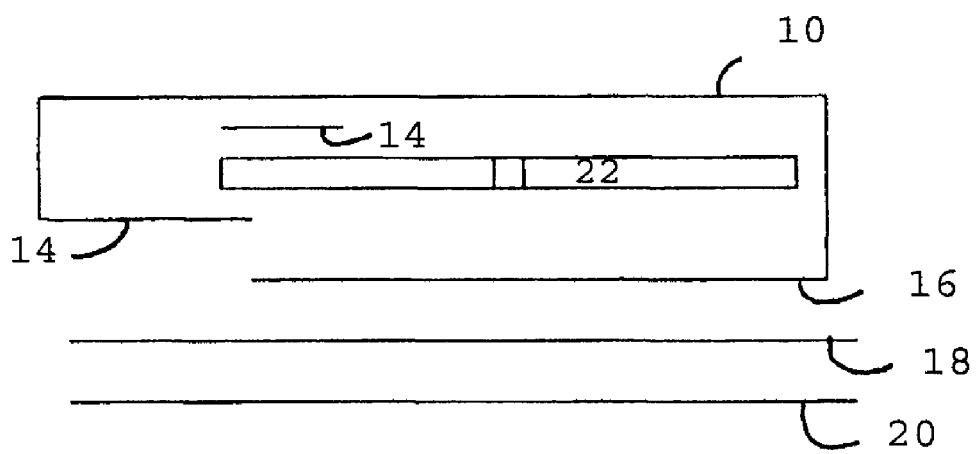
FIG. 5 is a schematic sectional view, not to scale, through the center and parallel to the long side of the blank of FIG. 1 assembled into a mailpiece with an optical disc inside.
Figure 6:
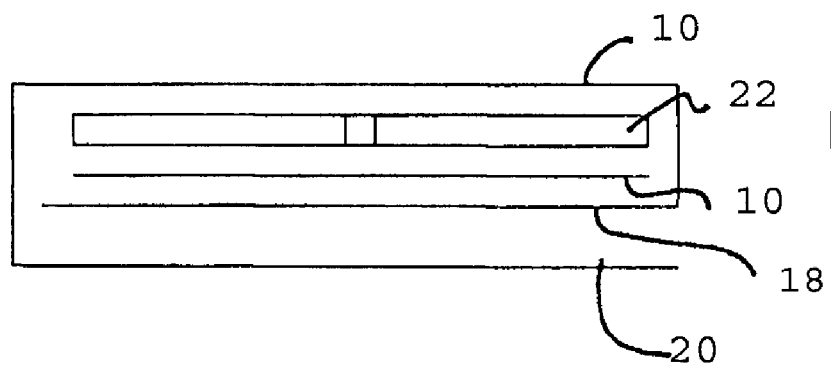
FIG. 6 is a schematic sectional view, not to scale, parallel to the short side of the assembled mailpiece and through the center of a disc inside the blank of FIG. 1 assembled into a mailpiece with an optical disc inside.

FIG. 3, which is not to scale so that it will more clearly illustrate the arrangement of panels and the disc in an assembled mailpiece, is a side view of the mailpiece from its short right side. FIGS. 3-6 are schematic views that are not to scale. The folds between panels are shown as rectangular in side views and in cross-section for clarity in FIGS. 3-6, and the thickness of an optical disc and the vertical distances between panels are exaggerated. It should be understood that in practice the folds are rounded and the mailpiece is much thinner in the vertical direction. Central panel 10 and right panel 16 show in FIG. 3 as joined at the fold line between them, and front panel 20 shows as folded under central panel 10 and over upper panel 18. FIG. 4 is a similar view from the long side of the assembled mailpiece where central panel 10 and upper panel 18 show as joined at the foldline that separates them and front panel 20 shows as folded under central panel 10 and over upper panel 18. FIG. 5 similarly shows the assembled mailpiece with a disc inside but in a cross-section through the center opening 22a of disc 22 and parallel to the long side of the mailpiece. As seen in FIG. 5, disc 22 is under central panel 10 but is partly inserted into cutout 14a such that a part of left panel 14 is between central panel 10 and disc 22 and a part of left panel 14 is under disc 22. right panel 16 is under disc 22, upper panel 18 is under right panel 16, and front panel 20 is under upper panel 18. FIG. 6 is a similar cross-sectional view through the center of disc 22 but parallel to the short side of the assembled mailpiece. As seen, disc 22 is under central panel 10, right panel 16 is under disc 22, upper panel 18 is under panel 16, and front panel 20 is under panel 18.

Preferably, and when it is desired that the assembled mailpiece with an optical disc inside comply with the U.S. Postal Service standards for automated letter processing, the assembled mailpiece is less than a quarter-inch thick, and is 7 inches long and 5 inches high, using a blank having the shape and dimensions shown in FIG. 1. As mentioned above, in the assembled mailpiece the disc is offset from the left side of the mailpiece, as best seen in FIGS. 2 and 5. In other embodiments, the optical disc mailpiece when assembled can have an aspect ratio in the range of 4.5-5.5 to 6.7-7.5. The blank of FIG. 1 can be made of 10-point cardboard, and preferably is made of sheetstock of 20 lb. basis weight (17 by 22 inches by 500 sheets) to 70 lb. basis weight (25 by 38 inches by 500 sheets), and more preferably of a minimum of 24 lb. basis weight (17 by 22 inches by 500 sheets). Preferably, in the assembled mailpiece the distance between the upper and lower foldlines exceeds 120 mm by less than 10 mm, and more preferably by less than 5 mm, thereby matching an optical disc having a nominal diameter of 120 mm. Preferably, the assembled mailpiece with an optical disc inside, is at least 0.009 inches thick and no more than 0.250 inches thick, in order to meet the U.S. Postal Service standards for an automation-compatible letter-size mailpiece (in particular, Quick Service Guide 201b). Preferably, optical disc 22 is secured inside the assembled mailpiece such that it is spaced from the left foldline by no less than 40 mm and more preferably by about 50 mm and from each of the other foldlines by no more than 10 mm and more preferably by no more than 5 mm, and is held in position by its engagement with cutout 14a and the upper, lower and right foldlines as viewed in FIG. 1.

The above specific embodiments are illustrative, and many variations can be introduced on these embodiments without departing from the spirit of the disclosure or from the scope of the appended claims.

The invention claimed is:

1. An optical disc mailpiece meeting U.S. Postal Service standards for automation-compatible letters when said mailpiece encloses an optical disc of a nominal diameter up to and including 120 mm and nominal thickness up to and including 1.2 mm, comprising:

a five-panel cardboard blank having a generally rectangular central panel delineated from a left panel, an upper panel, a right panel and a front panel by respective left, right, upper and lower foldlines;

said left panel having a generally upwardly extending, crescent-shaped cutout;

said blank forming an optical disc mailpiece when the left, right, upper, and front panels are folded under the central panel along the respective foldlines in that order; and wherein said panels and said cutout in the left panel are shaped and dimensioned such that when the left panel is folded under the central panel, the cutout in the left panel accepts a left portion of the optical disc and the disc is spaced from the left foldline by a substantially greater distance than from the other three foldlines;

wherein the disc is secured within the mailpiece by the cutout in the left panel and by the right, upper and lower foldlines when the right panel is folded under the central panel and over the disc and the left panel, the upper panel is folded under the central panel and over the folded right panel, and the front panel is folded under the central panels and over the upper panel; and at least one wafer seal securing the front panel to the central panel to the central panel after the panels are folded;

wherein the mailpiece is compatible with United States Postal Service Quick Service Guide 201 effective Mar. 13, 2008 for Automated Letters.

2. An optical disc mailpiece as in claim 1 in which the aspect ratio of the mailpiece is in the range of 4.5-5.5 to 6.7-7.5.

3. An optical disc mailpiece as in claim 1 in which the aspect ratio of the mailpiece is 5 to 7.

4. An optical disc mailpiece as in claim 1 in which the central panel is nominally a 5×7 inches rectangle.

5. An optical disc mailpiece as in claim 1 in which the cardboard blank is 10-point cardboard.

6. An optical disc mailpiece as in claim 1 in which both sides of the blank are printable surfaces for carrying graphics and/or labels.

7. An optical disc mailpiece as in claim 1 in which each of the upper, front, and central panels is generally rectangular.

8. An optical disc mailpiece as in claim 1 in which the left and right panels are non-rectangular.

9. An optical disc mailpiece as in claim 1 in which each of the left and right panels tapers with distance from the foldline delineating the respective one of the left and right panels from the central panel.

10. An optical disc mailpiece as in claim 1 in which the right panel covers the cutout when folded over the left panel.

11. An optical disc mailpiece as in claim 1 which the distance between the upper and lower foldlines exceeds 120 mm by less than 10 mm, thereby matching an optical disc having a nominal diameter of 120 mm.

12. An optical disc mailpiece as in claim 1 in which the folded mailpiece containing the disc is no more than ¼ inch thick, and is 7 inches long and 5 inches high, and wherein the disc inside the folded mailpiece is less than ¼ inch from each of the upper, lower and right foldlines but more than 1 inch from the left foldline.

13. An optical disc mailpiece comprising:

a unitary five-panel cardboard blank having a generally rectangular central panel, a left panel, a right panel, an upper panel and a front panel, with foldlines between the central panel and each of the other four panels;

said left panel having a cutout shaped to accept a peripheral portion of an optical disc;

said blank forming an optical disc mailpiece when the left panel is folded under the central panel and a disc is inserted into said cutout, said right panel is folded under the central panel and over the disc and the left panel, said upper panel is folded under the central panel and over the right panel, and said front panel is folded under the central panel and over the upper panel, said left, right, upper, and front panels being folded along said foldlines; and wherein said panels and said cutout in the left panel are shaped and dimensioned such that after said folding and insertion of the disc, the disc is offset to the right over said central panel, with a left edge of the disc being spaced from the left side of the mailpiece and with a right edge of the disc adjacent the right side of the mailpiece; and wherein the disc is secured within the folded mailpiece against left-right movement by the cutout and the right foldline, and is secured against up-down movement by the upper and lower foldlines; and at least one wafer seal securing the front panel to the central panel after the panels are folded;

wherein the folded mailpiece with an optical disc therein is less than one quarter inch thick, between 5 and 11½ inches long, and between 3½ and 6⅛ inches high.

14. An optical disc mailpiece as in claim 13 in which the folded mailpiece is 7 inches long and 5 inches high.

15. An optical disc mailpiece as in claim 13 in which the left and right panels are tapered.

16. An optical disc mailpiece as in claim 13 in which the panels have rounded free corners.

17. A method of mailing an optical disc comprising:

folding a left panel of a unitary five-panel cardboard blank under a generally rectangular central panel, with an optical disc inserted partly into a cutout of the left panel such that the disc is offset by more than 1 inch from the left side of the central panel but less than ½ inch from each of the other three sides of the central panel, folding a right panel of the blank under the central panel and over the disc and the left panel, folding an upper panel of the blank under the central panel and over the right panel, and folding a front panel of the blank under the central panel and over the upper panel, and securing at least one free end of the front panel in its folded position by an adhesive element;

labeling the folded mailpiece with address information and providing postage thereon; and submitting the mailpiece to automated letter processing in the United States Postal Service complying with standards thereof for such processing.

18. A method as in claim 17 including dimensioning said panels to form a folded mailpiece that is 7 inches long and 5 inches high and no more than ¼ inch thick with a disc therein.

19. A method as in claim 18 including dimensioning the panels relative to a circular disc such that the disc in the folded mailpiece is more than 1 inch from the left side of the mailpiece and less than ¼ inch from the other three sides.

20. A method as in claim 17 comprising using a wafer seal to provide said adhesive element.

\* \* \* \* \*